United States Patent [19]

McMinn et al.

[11] Patent Number: 5,327,571
[45] Date of Patent: Jul. 5, 1994

[54] PROCESSOR HAVING DECODER FOR DECODING UNMODIFIED INSTRUCTION SET FOR ADDRESSING REGISTER TO READ OR WRITE IN PARALLEL OR SERIALLY SHIFT IN FROM LEFT OR RIGHT

[75] Inventors: Brian D. McMinn, Austin, Tex.; Robert H. Perlman, San Jose, Calif.; Prem Sobel, Pondicherry, India

[73] Assignee: Advanced Micro Devices, Inc., Sunnyvale, Calif.

[21] Appl. No.: 104,398

[22] Filed: Aug. 10, 1993

Related U.S. Application Data

[63] Continuation of Ser. No. 505,351, Apr. 3, 1990, abandoned.

[51] Int. Cl.5 .................... G06F 9/315; G06F 9/312; G06F 9/30
[52] U.S. Cl. ................... 395/800; 395/375; 395/425; 364/247; 364/247.3; 364/247.4; 364/244.5; 364/976.5; 364/933; 364/933.3; 364/933.61; 364/965.7; 364/DIG. 2
[58] Field of Search ............ 395/800, 425, 375

[56] References Cited

U.S. PATENT DOCUMENTS

| | | | |
|---|---|---|---|
| 3,815,095 | 6/1974 | Wester | 395/800 |
| 3,953,834 | 4/1976 | Burkett et al. | 395/775 |
| 3,982,229 | 9/1976 | Rouse et al. | 395/775 |
| 4,021,783 | 5/1977 | Highberger | 395/775 |
| 4,198,682 | 4/1980 | Albani et al. | 395/575 |
| 4,212,076 | 7/1980 | Conners | 364/706 |
| 4,219,874 | 8/1980 | Gusev et al. | 395/775 |
| 4,525,776 | 6/1985 | Eldumiati et al. | 395/375 |
| 4,622,650 | 11/1986 | Kulisch | 364/748 |
| 4,646,232 | 2/1987 | Chang et al. | 395/325 |
| 4,785,393 | 11/1988 | Chu et al. | 395/375 |
| 4,816,817 | 3/1989 | Herrington | 345/198 |
| 4,851,834 | 7/1989 | Stockebrand et al. | 345/189 |
| 4,907,148 | 3/1990 | Morton | 395/800 |
| 4,959,813 | 9/1990 | Todoroki | 365/189.12 |
| 4,974,157 | 11/1990 | Winfield et al. | 395/775 |
| 5,008,905 | 4/1991 | Lee et al. | 377/77 |

*Primary Examiner*—Thomas C. Lee
*Assistant Examiner*—Paul Harrity
*Attorney, Agent, or Firm*—Johnson & Gibbs

[57] ABSTRACT

A processor for collecting boolean conditions of multiple operations includes a condition collection register which may be written and read in parallel or written serially and into which a single bit is shifted from either the left or the right, and a processor instruction decoder that decodes one operand register addresses as a read address for the condition collection register, and three operand register addresses as a write address for said condition collection register.

6 Claims, 3 Drawing Sheets

PROCESSOR HAVING DECODER FOR DECODING UNMODIFIED INSTRUCTION SET FOR ADDRESSING REGISTER TO READ OR WRITE IN PARALLEL OR SERIALLY SHIFT IN FROM LEFT OR RIGHT

This is a continuation of application Ser. No. 07/505,351, filed Apr. 2, 1990 now abandoned.

CROSS REFERENCE TO RELATED APPLICATIONS

This application is related to the following U.S. patent applications:

| SERIAL NO. | TITLE | INVENTOR |
| --- | --- | --- |
| 07/503,817; now U.S. Pat. No. 5,053,631 | Pipelined Floating Point Processing Unit | Perlman, et al. |
| 07/503,819; now U.S. Pat. No. 5,058,048 | Normalizing Pipelined Floating Point Processing Unit | Gupta, et al. |
| 07/504,127; now U.S. Pat. No. 5,128,888 | Arithmetic Unit Having Multiple Accumulators | Tamura, et al. |
| 07/505,350; cont. as 07/806,820; now U.S. Pat. No. 5,206,828 | A Special Carry Save Adder For High Speed Iterative Division | Shah, et al. |
| 07/503,818; cont. as 07/678,660; cont. as 07/840,622, now abandoned | High Speed Mixed Radix Adder | Lynch, et al. |
| 07/503,822; now U.S. Pat. No. 5,095,458 | Radix 4 Carry Lookahead Tree and Redundant Cell Therefor | Lynch, et al. |
| 07/504,324; now U.S. Pat. No. 5,128,891 | High Speed Divider With Square Root Option | Lynch, et al. |

All cross references are filed on even date herewith and assigned to the assignee of the present invention which are all hereby incorporated by this reference thereto.

BACKGROUND OF THE INVENTION

1. Field of the Invention

The present invention relates to computer architecture and digital systems. More particularly, the present invention relates to a means for collecting boolean conditions of multiple operations in a microprocessor.

2. Description of Related Art

It is useful in certain applications to be able to perform a series of computer operations, be they boolean, logical, or arithmetic, and to produce a single word containing a number of bits, each bit representing a boolean result for one of the operations performed. An example of this resides in a common graphics two-dimensional window clipping. In such a clipping, the final boolean result—TRUE or FALSE—refers to whether a point on a plane lies inside a rectangular region bounded by cartesian coordinates $(X_1, Y_1)$ $(X_2, Y_1)$, $(X_1, Y_2)$ and $(X_2, Y_2)$. Whether the point resides in such a region may be determined by determining whether the X coordinate of the point is less than $X_1$, whether the X coordinate of the point is greater than $X_2$, whether the Y coordinate of the point is less than $Y_1$, and whether the Y coordinate of the point is greater than $Y_2$. The results of these four determinations can be used to construct a four-bit word embodying TRUE (the relevant coordinate is less or greater as asked) or FALSE (the relevant coordinate is not less or greater as asked). Of course, four FALSE's means the point does lie in the rectangular region. Assuming TRUE's and FALSE's can take on values 1 and 0, respectively, the result of each operation can be placed into a four-bit word that will be zero if the point is in the rectangular region, and non-zero otherwise.

Heretofore, collection of conditions as described above has been handled two different ways. One way involves condition collection by software. In this technique, several simple computer operations are used to generate an operation result, to reduce this result to a single bit indicating whether the result is TRUE or FALSE, and then to shift or to rotate this bit into a multi-bit word containing other conditions. In some embodiments of this type of condition collecting, several steps are combined. However, in all cases two or more operations are required to process each condition collected. Thus, this manner of condition collecting is generally inefficient.

The second prior art way of collecting conditions involves hardware. In this technique, a special computer instruction is created, and special computer hardware added, to allow conditions to be collected, but with constraints on just which operations can contribute to the collection. An example of this is the 34010 graphics processor manufactured by Texas Instruments Incorporated of Dallas, Tex. This processor contains a special window clipping operation that performs multiple comparisons, and that places the comparison results in a special register. Shortcomings of this approach are that the instruction set of the processor must be modified and that a programmer cannot readily specify arbitrary conditions to be collected.

Based on the foregoing, it is clear that it is a shortcoming and deficiency of the prior art that there is nowhere disclosed or suggested an apparatus or method lacking multiple software operations per conditions collected, allowing collection of a series of conditions produced by operations of arbitrary type, and obviating need for a change to the instruction set of a processor to which it may be added.

Although there are no known prior art teachings of a solution to the aforementioned deficiency and shortcoming such as that disclosed and claimed herein, a number of prior art references exist that discuss subject matter that bears some relation to matters discussed herein. Such prior art references are U.S. Pat. Nos. 4,212,076, 3,982,229 and 4,525,776. Each of these references is discussed briefly below.

U.S. Pat. No. 4,212,076 to Conners is directed to a digital computer structure in which boolean logic operations control arithmetic logic operations. Conners' digital computer structure performs chained boolean logic processing on any selected bit of various selected words held in memory. Then, Conners' structure uses the logic processing result by storing it at any selected bit location in any of various selected words held in memory.

U.S. Pat. No. 3,982,229 to Rouse et al. relates to a combinational logic arrangement. Rouse et al. disclose such an arrangement for use in a data processor that selectively performs a plurality of bit manipulations or logic operations including shift, rotate and insert under mask. Rouse et al.'s arrangement is controlled by a single instruction format which specifies the parameters needed for each of the operations.

U.S. Pat. No. 4,525,776 to Eldumiati et al. teaches an arithmetic logic unit that moves, in response to instructions residing in an instruction register, any bit from any position in a source to any bit position in a destination in a single instruction interval.

Review of each of the foregoing patents reveals no disclosure or suggestion of a system or method such as that described and claimed herein.

SUMMARY OF THE INVENTION

To overcome the deficiencies and shortcomings of the prior art discussed above, the present invention provides a processor for collecting boolean conditions of multiple operations including a condition collection register which is written and read in parallel or serially and in which a single bit is shifted into the register from either the left or the right. The processor provided by the present invention also includes a processor instruction decoder that decodes one operand register address as a read address and three operand register addresses as write addresses for the condition collection register.

Accordingly, it is an object of the present invention to provide an efficient means of collecting boolean conditions of multiple operations in a microprocessor, but without modifying the processor instruction set.

Another object of the present invention is to allow for the collection of boolean conditions arising from any computer operation that produces either a boolean, logical, or arithmetic result, without restriction as to the intermixing of operation types.

Yet another object of the present invention is to allow the intermixing of operations whose boolean results are to be collected with those whose results are not to be collected, with no loss of efficiency.

BRIEF DESCRIPTION OF THE DRAWINGS

Other objects, advantages and novel features of the present invention will become apparent from the detailed description of the invention when considered in conjunction with the accompanying drawings wherein.

DETAILED DESCRIPTION OF THE INVENTION

Figure 1:
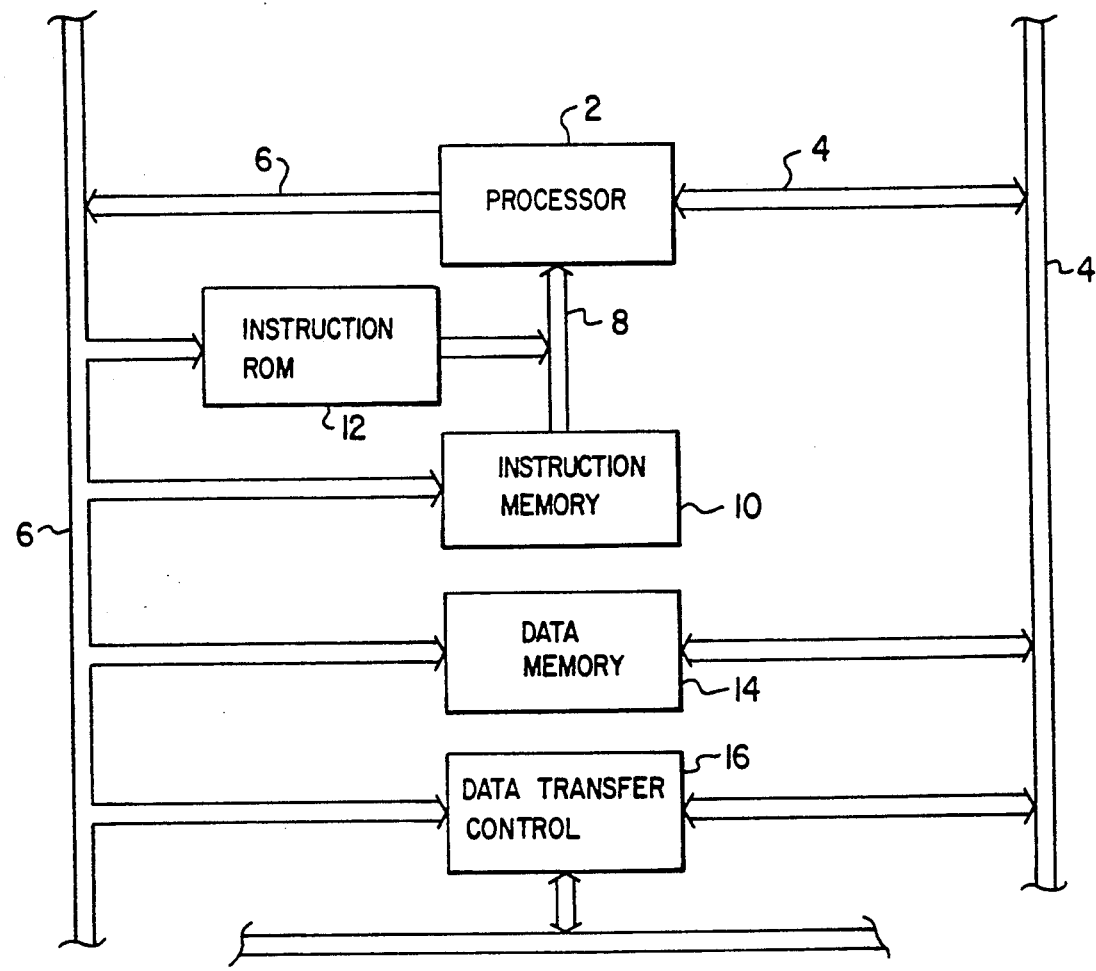
FIG. 1 is a block diagram of system incorporating the present invention.

Referring now to FIG. 1, a block diagram of system in which the present invention may be incorporated is shown. The system shown in FIG. 1 may be seen to comprise a processor 2. Processor 2 accesses external instructions and data via three buses 4, 6, 8. Bus 4 is a data bus, bus 6 is an address bus, and bus 8 is an instruction bus. Address bus 6 may be seen to be shared between instruction and data accesses as it is routed to an instruction memory element 10, which is operatively connected between the address bus 6 and the instruction bus 8. Further connected to the processor 2 via the instruction memory element 10 is an instruction read only memory (ROM) 12, also operatively connected between the address bus 6 and the instruction bus 8. System data memory in FIG. 1 is designated by reference numeral 14. The system 2 is connected to a system bus 16 via a data transfer controller 16. Both the data memory 14 and data transfer control are operatively connected between the address bus 6 and data bus 4.

Figure 2:
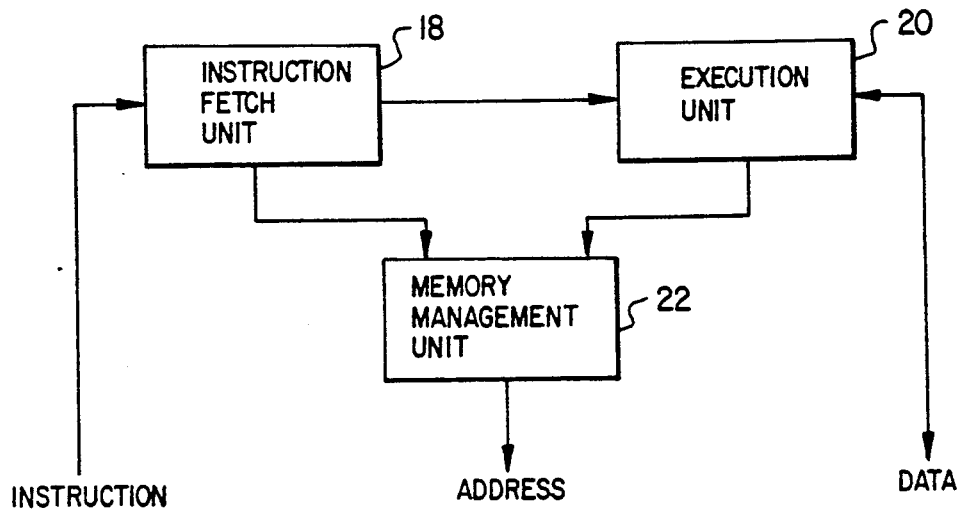
FIG. 2 is a block diagram of the processor shown in FIG. 1.

Referring now to FIG. 2, a block diagram depicting further details about the processor 2 is set forth. Three major subsystems of the processor 2 may be seen therein to be an instruction fetch unit 18, an execution unit 20, and a memory management unit 22. From FIG. 2, and by comparing FIGS. 1 and 2, it may be seen that the instruction bus 8 is operatively connected to the instruction fetch unit 18, the address bus 6 is operatively connected to the memory management unit 22, and the data bus 4 is operatively connected to the execution unit 20.

The processor 2 shown in FIG. 2 implements a four-stage pipeline for instruction execution. The four stages are fetch, decode, execute and write-back. The fetch stage is effectively performed by the instruction fetch unit 20 which both fetches instructions and supplies instructions to other functional units. The execution unit 22 executes instructions. So doing, the execution unit 22 is the primary operating element during the decode and execution stages. During the decode stage, the execution unit 22 decodes the instruction selected during the fetch stage, and fetches and/or assembles the required operands. During this stage, the execution unit 22 also evaluates addresses for branches, loads, and stores. Thus, in the cases of branches, loads, and stores during the execute stage, the memory management unit 24 performs address translation if required. The memory management unit 24 operates during the execute stage of the pipeline so that the physical address it generates are available at the beginning of the write-back stage. During the write-back stage, then, the results of the operation performed during the execute stage are stored. In the case of branches, loads, and stores, the physical address resulting from translation during the execute stage is transmitted to an external device or memory.

Further with respect to the memory management unit 24, it should be appreciated that in the illustrated embodiment, all addresses for external accesses are physical addresses. The operation of the memory management unit 24 is pipelined with external accesses so that an address translation can occur while a previous access completes. Also, it should be appreciated that address translation is not performed for addresses associated with instruction prefetching. Instead, these addresses are generated by an instruction prefetch pointer which is incremented by the processor 2. Address translation is performed only at the beginning of the prefetch sequence (as the result of a branch instruction), and when the prefetch pointer crosses a potential virtual-page boundary.

The instruction fetch unit 18 of processor 2 fetches instructions, and supplies instructions to other functional units. The unit 18 incorporates an instruction prefetch buffer, a branch target cache, and a program counter unit. These subunits will be discussed further below with reference to FIG. 3. All components of the instruction fetch unit 18 operate during the fetch stage of the processor pipeline.

The execution unit 20, discussed to some extent above, includes a register file, an address unit, an arithmetic logic unit, a field shift unit, and a floating point unit. These subunits, like the subunits of the instruction fetch unit 18, are also discussed further below with reference to FIG. 3. The register file and address unit operate during the decode stage of the pipeline. The arithmetic/logic unit, field shift unit, and prioritizer operate during the execute stage of pipeline. The register file operates during the decode stage to provide operands for the execution unit and again during the write-back stage to store results.

Interconnection of the units 18, 29, 22 in processor 2, as well as their interfaces with system buses, are also shown in FIG. 2.

Figure 3:
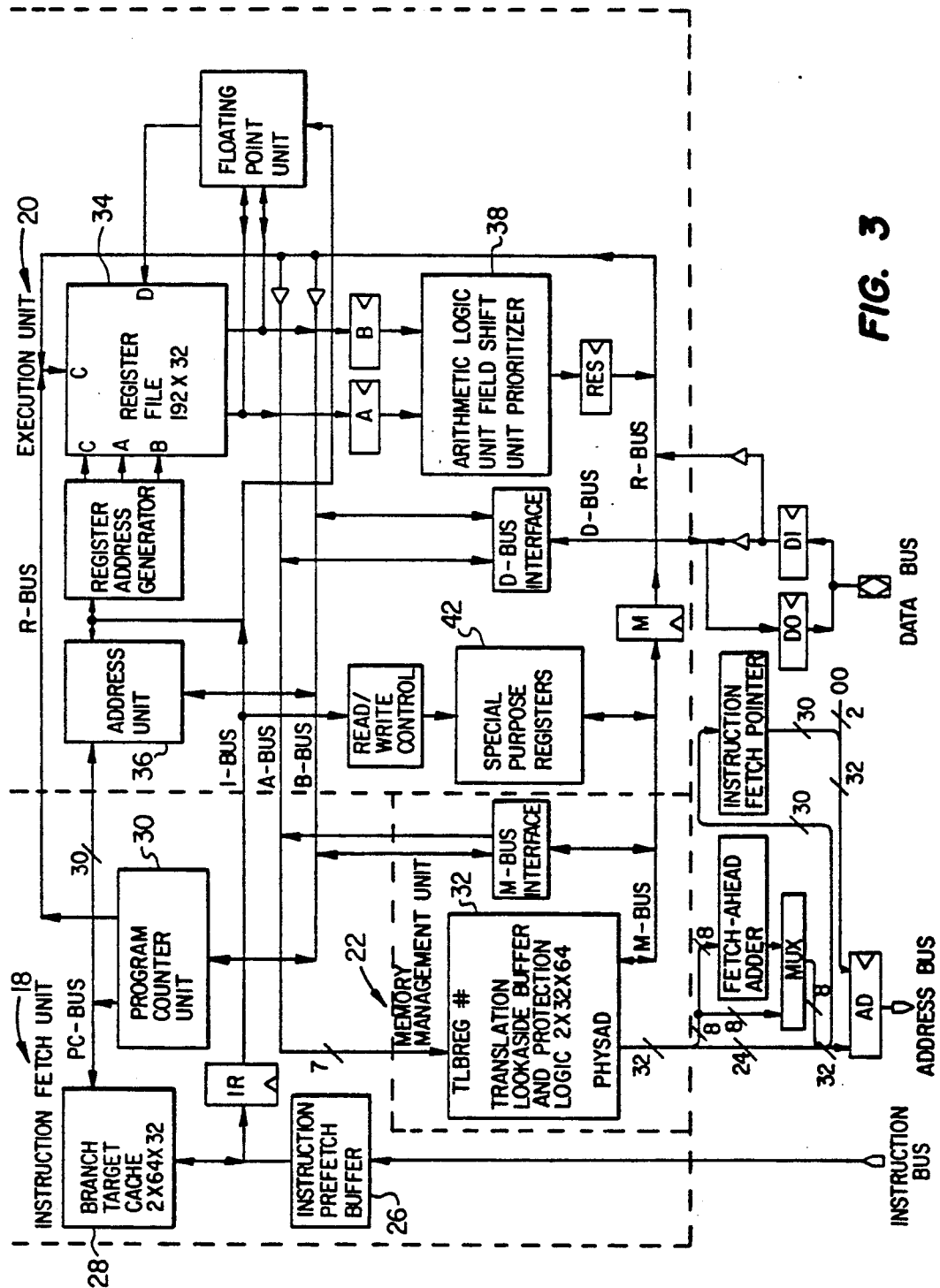
FIG. 3 is a more detailed block diagram of the processor of FIG. 2.

Referring now to FIG. 3, even further details regarding the subcomponents of the processor 2 are shown diagrammatically. As previously mentioned, the instruction fetch unit 18 may be seen to comprise an instruction prefetch buffer 26, a branch target cache 28, and a program counter unit 30. As also previously mentioned, the memory management unit 22 may be seen to comprise means 32 for performing address translation and memory protection functions for all branches, loads and stores. Finally, the execution unit 20 may be seen to comprise a register file 34, an address unit 36, an arithmetic/logic unit 38, a field shift unit (also designated by reference numeral 38), a prioritizer (also designated by reference numeral 38), and a floating point processing unit 40. Although various other elements (e.g., special purpose registers 42) and interconnection details are shown in FIG. 3, because they are only peripherally related to the present invention, and because the diagram alone is sufficiently communicative to those skilled in the art to understand processor 2 well, further details regarding all units other than the floating point unit 40 and other elements to which it is operatively connected are not set forth herein.

Several important points with respect to the present invention may be seen and now discussed with reference to FIG. 3. First, the register file 34 of the execution unit 20 may include a condition collection register of arbitrary width, which register may be written or read in parallel, i.e., as a word, and which register is also capable of being written serially, with a single bit from each result being shifted into the register from either the most—or least—significant end. The AM 29000 32-Bit Streamlined Instruction Processor, manufactured by the assignee of the present invention, includes an existing operand register that could be modified to serve as a condition collection register, as described above. Second, the processor instruction decoder 52 can operate so as to decode one operand register address (RCCP) as the read address for the condition collection register discussed above, and to decode three operand register address (herein, "WCCP", "WCCSL" and "WCCSR") as write addresses for the condition collection register.

Recalling now the graphics 20 window clipping application discussed in the description of related art section above, it should be appreciated that the operations discussed producing the conditions to be collected create boolean results which may be stored into register file 34. Operations creating logical or arithmetic results can also be used to produce boolean conditions that can then be collected into a single, multi-bit word. For example, one possible variation on the window clipping algorithm is to combine the scaling of object positions by factor K with a comparison to a limit, using the following arithmetic operations:

Result $1 < -X*K - X_l$
Result $2 < -X*K - X_r$
Result $3 < -Y*K - Y_b$
Result $4 < -Y*K - Y_t$, Each such operation produces an arithmetic result having values 1 ??? . . . ? or 0 ??? . . . ? for negative and non-negative results, respectively. With the provision of a mechanism for placing the most significant bit of each of the four operation results in a 4-bit word (with the MSB of Result 1 going into the MSB of the 4-bit word, and so on), and if the resulting word is XOR'ed with the word 0101 (to reverse the sense of the second and fourth subtractions), the final word will be 0 if the point is in the rectangle, and non-zero otherwise.

Based upon the foregoing, the present invention may now be understood as providing such a mechanism by incorporating into a processor architecture a condition collection register and a processor instruction decoder as has been discussed above.

Figure 4:
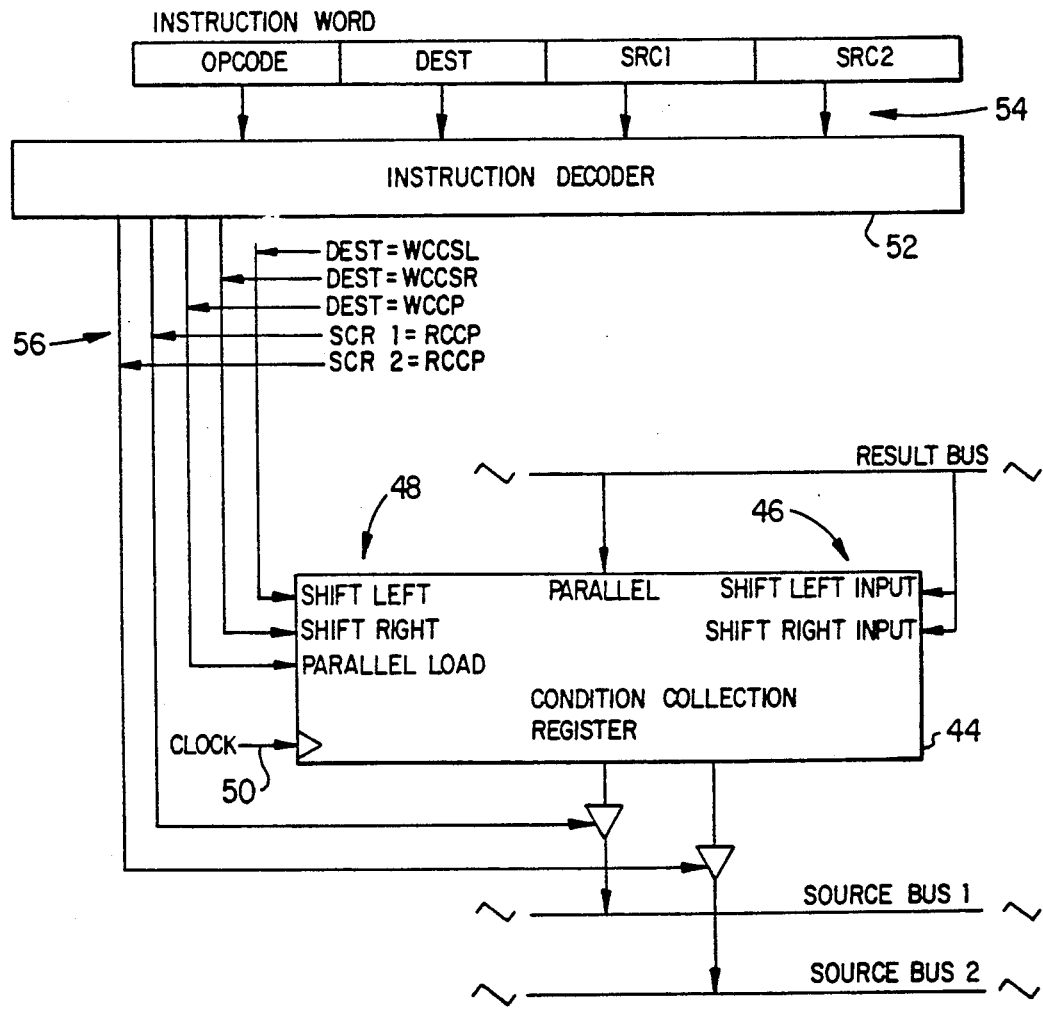
FIG. 4 is a block diagram of operative elements of the present invention.

A block diagram of an embodiment of the present invention is shown in FIG. 4. In FIG. 4 it may be seen that the condition collection register 44 may be written or read in parallel or written serially. Written serially, a single bit may be shifted into the register 44 from either the most—or least—significant end on each write (indicated generally by reference numeral 46). The register 44 also has shift left, shift right and parallel load control inputs (generally indicated by reference numeral 48) and is driven by a clock signal 50.

In FIG. 4 the instruction decoder is indicated by reference numeral 52. Based upon the inputs 54 to and outputs 56 of the instruction decoder 52 shown in FIG. 4, it should be appreciated that the processor instruction decoder decodes one operand register address (RCCP) as the read address for the condition collection register, and decodes three operand register addresses (WCCP, WCCSL and WCCSR) as write addresses for the condition collection register.

In an embodiment of the present invention such as that shown in FIG. 4, when an instruction specifies the condition collection register as either the source or destination of an operation, the following actions are taken, depending on the specific operand register specifications:

SRC1 = RCCP: The operation to be performed takes its first source from the condition collection register.

SRC2 = RCCP: The operation to be performed takes its second source from the condition collection register.

DEST = WCCP: The operation result is parallel-loaded into the condition collection register at the conclusion of the operation.

DEST = WCCSL: The MSB of the operation result is left-shifted into the LSB of the condition collection register at the conclusion of the operation.

DEST = WCCSR: The MSB of the operation result is right-shifted into the MSB of the condition collection register at the conclusion of the operation.

The above-described invention, as should now be fully understood by those skilled in the art, provides an efficient (e.g., low-cycle-count) means of collecting boolean conditions of multiple operations in a microprocessor, without requiring modification of the processor instruction set. The present invention also allows for the collection of boolean conditions arising from any computer operation that produces either a boolean, logical, or arithmetic result, without restriction as to the intermixing of operation types. Additionally, the present invention allows the intermixing of operations whose boolean results are to be collected with those whose results are not to be collected, with no loss of efficiency. As compared to the software condition collection and hardware condition collections efforts of the prior art, discussed in the description of related art section above, the present invention does away with the need for multiple software operations per condition collected, allows collection of a series of conditions produced by operations of arbitrary type, and does not require a change in the instruction set of the processor to which it is added. Those skilled in the art should now understand the tremendous advantages the present invention possesses as compared to the characteristics of the prior art.

There are a number of possible variations of the present invention. For example, by decoding additional source addresses, the condition collection register could be made to shift either left or right after reads. This would have application in the collection and testing of vector condition operations, such as those produced by some vectorizing FORTRAN compilers. In conjunction with such shifting either left or right after reads, the recirculation of shifted bits could be enabled or disabled with a control register mode bit. Yet another variation of the present invention, in cases in which adding or changing the instruction set is not objectionable, could involve implication by the opcode of use of the condition collection register as a source or a destination of an operation. Still yet other embodiments of the present invention could involve shifting of a bit other than the MSB (e.g., the LSB) of the result into the condition collection register. Even the carry or overflow from arithmetic operations could be so manipulated.

Those skilled in the art will recognize that many modifications and variations besides those specifically mentioned may be made in the structure and techniques described herein without departing from the concept of the present invention. It should be especially noted along this line that while the invention has been explained herein in the context of a processor with three-operand instructions, there is nothing to preclude the use of this invention in other architectures. Accordingly, it should be understood that, within the scope of the appended claims, the present invention may be practiced otherwise than as specifically described herein.

What is claimed is:

1. A processor for collecting boolean conditions of multiple operations comprising:

a multiple-bit condition collection register which, during and by processor operation, may be written and read in parallel or written serially and into which a single bit is shifted from either the left or the right;

a processor instruction decoder structurally interconnected to said condition collection register for decoding an unmodified processor instruction set including a plurality of operand register addresses for reading source information from and writing operation result information to said condition collection register, wherein said processor instruction decoder decodes a first operand address as a read address for said condition collection register so as to read the source information from said condition collection register in parallel, a second operand address as a write address for said condition collection register so as to write the operation result information to said condition collection register in parallel, a third operand address as a write address for said condition collection register so as to serially shift operation result information into said condition collection register from the left, and a fourth operand address as a write address for said condition collection register so as to serially shift operation result information into said condition collection register from the right.

2. The processor as recited in claim 1, wherein each operation has an associated source, destination, and result, and wherein when an instruction specifies said condition collection register as the source of an operation, the operation to be performed takes its first source from said condition collection register.

3. The processor as recited in claim 2, wherein when an instruction specifies said condition collection register as the source of an operation, the operation to be performed takes its second source from said condition collection register.

4. The processor as recited in claim 3, wherein when an instruction specifies said condition collection register as the destination of an operation, the operation result is parallel-loaded into said condition collection register at the conclusion of the operation.

5. The processor as recited in claim 3, wherein when an instruction specifies said condition collection register as the destination of an operation, the most significant bit of the operation result is left-shifted into the least significant bit of the condition collection register at the conclusion of the operation.

6. The processor as recited in claim 3, wherein when an instruction specifies said condition collection register as the destination of an operation, the most significant bit of the operation result is right-shifted into the most significant bit of the condition collection register at the conclusion of the operation.

* * * * *